(12) United States Patent
Rodriguez Bravo et al.

(10) Patent No.: US 11,122,062 B2
(45) Date of Patent: Sep. 14, 2021

(54) REMOTE INTERFERENCE ASSESSMENT AND RESPONSE FOR AUTONOMOUS VEHICLES

(71) Applicant: International Business Machines Corporation, Armonk, NY (US)

(72) Inventors: Cesar Augusto Rodriguez Bravo, Alajuela (CR); David Jaramillo, Durham, NC (US); Romelia H. Flores, Keller, TX (US); Gregory J. Boss, Saginaw, MI (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 16/364,219

(22) Filed: Mar. 26, 2019

(65) Prior Publication Data
US 2020/0314116 A1  Oct. 1, 2020

(51) Int. Cl.
*H04L 29/06* (2006.01)
(52) U.S. Cl.
CPC ................................ *H04L 63/1416* (2013.01)
(58) Field of Classification Search
CPC .. H04L 63/1416; H04L 63/1408; H04W 4/44; H04W 12/67; H04W 12/121
See application file for complete search history.

(56) References Cited

U.S. PATENT DOCUMENTS

| 8,126,642 | B2 | 2/2012 | Trepagnier |
| 8,392,065 | B2 | 3/2013 | Tolstedt |
| 8,781,669 | B1 | 7/2014 | Teller |
| 9,368,026 | B1 | 6/2016 | Herbach |
| 9,507,346 | B1 | 11/2016 | Levinson |
| 9,559,804 | B2 | 1/2017 | Ibrahim |
| 9,567,007 | B2 | 2/2017 | Cudak |
| 9,646,428 | B1 | 5/2017 | Konrardy |
| 9,720,410 | B2 | 8/2017 | Fairfield |
| 2013/0227636 | A1 | 8/2013 | Bettini et al. |
| 2015/0207812 | A1 | 7/2015 | Back et al. |
| 2015/0241241 | A1 | 8/2015 | Cudak |
| 2016/0255154 | A1 | 9/2016 | Kim |
| 2016/0363935 | A1 * | 12/2016 | Shuster .................. G08G 1/163 |
| 2017/0295195 | A1 | 10/2017 | Wettstein et al. |
| 2017/0372431 | A1 * | 12/2017 | Perl ........................ G07C 5/085 |
| 2018/0072265 | A1 | 3/2018 | Samadani |
| 2018/0220309 | A1 | 8/2018 | Gomes |

(Continued)

FOREIGN PATENT DOCUMENTS

DE  102011115223 A1  3/2013

OTHER PUBLICATIONS

"Mirai Botnet DDoS Attack Type" InternetArchive Wayback Machine. Feb. 4, 2017. One page. https://www.corero.com/resources/ddos-attack-types/mirai-botnet-ddos-attack.html.

(Continued)

*Primary Examiner* — Joseph P Hirl
*Assistant Examiner* — Thomas A Gyorfi
(74) *Attorney, Agent, or Firm* — Stephen R. Yoder

(57) ABSTRACT

Securing an autonomous vehicle against remote interference. Electronic communications are classified and rated according to communication port and package content. Communication ratings are processed to assess risk of remote interference. At-risk communications trigger interference response actions according to pre-defined ratings thresholds.

20 Claims, 5 Drawing Sheets

(56) References Cited

U.S. PATENT DOCUMENTS

| | | | |
|---|---|---|---|
| 2018/0255099 A1* | 9/2018 | Chen | H04L 67/10 |
| 2019/0191311 A1* | 6/2019 | O'Brien | G05D 1/0055 |
| 2019/0215325 A1* | 7/2019 | Glass | H04W 12/02 |
| 2019/0268367 A1* | 8/2019 | Willis | G06F 21/554 |
| 2020/0166897 A1* | 5/2020 | Campos | B60R 11/04 |

OTHER PUBLICATIONS

Feng et al. "Digital forensics model of smart city automated vehicles challenges." ICIS (2017). Five pages.

Garret "10 Million Self-Driving Cars Will Hit the Road by 2020—Here's How to Profit". Forbes.com. Mar. 3, 2017. Eight pages. https://www.forbes.com/sites/oliviergarret/2017/03/03/10-million-self-driving-cars-will-hit-the-road-by-2020-heres-how-to-profit/#4455fcdd7e50.

Harel et al. "Cyber Security and the Role of Intelligent Systems in Addressing its Challenges." ACM Transactions on Intelligent Systems and Technology (TIST) 8.4 (2017): 49. Twelve pages.

Huq et al. "Cyberattacks Against Intelligent Transportation Systems: Assessing Future Threats to ITS." Trend Micro Forward-Looking Threat Research (FTR) Team (2017). Sixty-six pages.

Jonston "Connected Car CAN Bus Can't Handle DoS Hacks/Attacks Researchers Report—CAN Standard Can Be Changed". auto connected car news. Aug. 17, 2017. http://www.autoconnectedcar.com/2017/08/connect-car-can-bus-cant-handle-dos-hacksattacks-researchers-report-can-standard-can-be-changed/

Karimini "How Hackers Could Draft Connected Cars Into Their Botnet Armies" INSIDE BlackBerry Nov. 8, 2016. http://blogs.blackberry.com/2016/11/how-hackers-could-draft-connected-cars-into-their-botnet-armies/.

Kott et al. "Toward Intelligent Autonomous Agents for Cyber Defense: Report of the 2017 Workshop by the North Atlantic Treaty Organization (NATO) Research Group IST-152-RTG." arXiv preprint arXiv:1804.07646 (2018). Forty-eight pages.

Ramquist "Proposals For The Secure Use of IoT Technology In The Car Industry-Proposals on how to use IoT technology in the car industry but avoid its negative security consequences." DISS UMEA Universitet (2016). Thirty-five pages.

\* cited by examiner

REMOTE INTERFERENCE ASSESSMENT AND RESPONSE FOR AUTONOMOUS VEHICLES

BACKGROUND OF THE INVENTION

The present invention relates generally to the field of autonomous vehicles, and more particularly to identifying and managing remote interference attempts.

An autonomous vehicle is a connected vehicle capable of navigation without substantial human intervention. Autonomous vehicles operate using a variety of technologies that may include LIDAR, RADAR, GPS, stereoscopic cameras; ultrasonic sensors, and infrared sensors. Operation of autonomous vehicles generally occurs within a connected environment including vehicle-to-vehicle, vehicle-to infrastructure, and infrastructure-to-infrastructure communications. Vehicular ad hoc networks (VANETs) make up a key technology used by autonomous vehicles. VANETs use roadside units to communicate with autonomous vehicles through wireless media.

SUMMARY

According to an aspect of the present invention, there is a method, computer program product and/or system for securing an autonomous vehicle that performs the following steps (not necessarily in the following order): (i) classifying network communications received at a set of communication ports within a vehicle; (ii) determining a risk level for network communications having target classifications; (iii) responsive to a high-risk communication, determining an impact level for the high-risk communication; (iv) assigning a suspicion score to each high-risk communication received during a tracking period, the suspicion score being a mathematical combination of the risk level and the impact level determined for each high-risk communication; (v) determining, for the vehicle, a risk exposure score corresponding to a set of suspicion scores assigned to the high-risk communications; and (vi) taking an interference response assigned to the risk exposure score. The high-risk communication is a network communication assigned a risk level meeting a threshold value.

DETAILED DESCRIPTION

Figure 1:
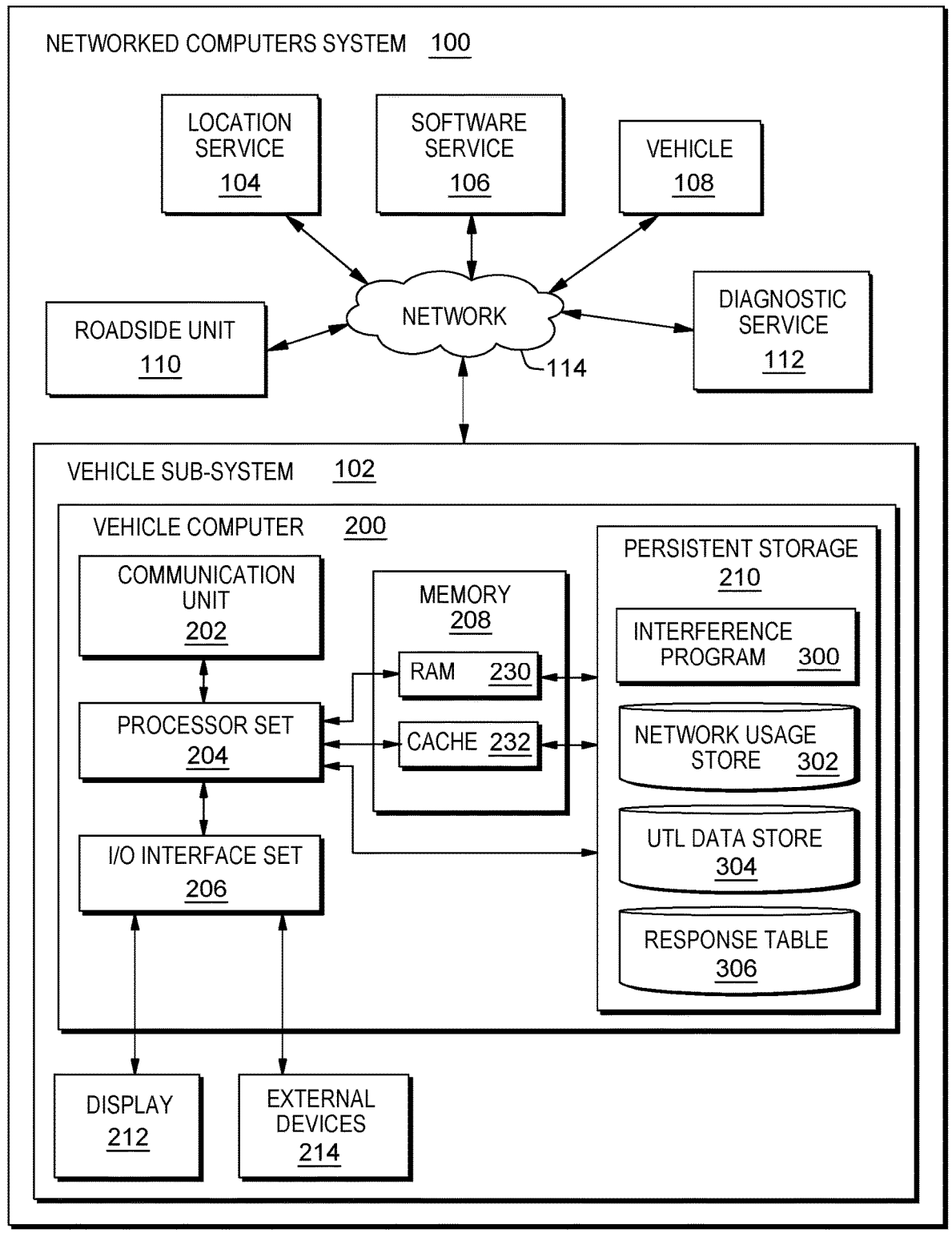
FIG. 1 is a block diagram view of a first embodiment of a system according to the present invention.

Securing an autonomous vehicle against remote interference. Electronic communications are classified and rated according to communication port, package content, package status, and internet protocol (IP) address. Communication ratings are processed to assess risk of remote interference. At-risk communications trigger remedial actions according to pre-defined ratings thresholds.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: vehicle sub-systems 102 and 108; location sub-system 104; software service sub-system 106; roadside unit sub-system 110; diagnostic service sub-system 112; communication network 114; vehicle computer 200; communication unit 202; processor set 204; input/output (I/O) interface set 206; memory device 208; persistent storage device 210; display device 212; external device set 214; random access memory (RAM) devices 230; cache memory device 232; interference program 300; network usage store 302; user tolerance level (UTL) data store 304; and interference response table 306.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Conventional security for autonomous vehicles takes considers reliability of the self-driving process itself. Autonomous vehicles, as a connected endpoint in a network environment, must also be secure in terms of network security, especially to avoid remote connections that may interfere with the performance of the vehicle such that they become a danger to society, passengers, and/or the vehicle.

Remote interference of an autonomous vehicle may include: (i) remote transmission of malicious firmware; (ii) remote installation of malicious firmware; (iii) jamming wireless transmissions; (iv) man-in-the-middle (MitM) initiatives that modify communications data; (v) exploitation of vulnerabilities in software, hardware, network protocols, and operating systems; (vi) gaining access to the controller area network using vehicle WiFi; (vii) remote interference of vehicle controls via a compromised controller area network; (viii) jamming a vehicle safety system such as radar and ultrasonic sensors; (ix) remote system discovery and abuse; and/or (x) various VANET initiatives deployed to confuse instructions to the vehicle and/or disrupt the network.

Figure 2:
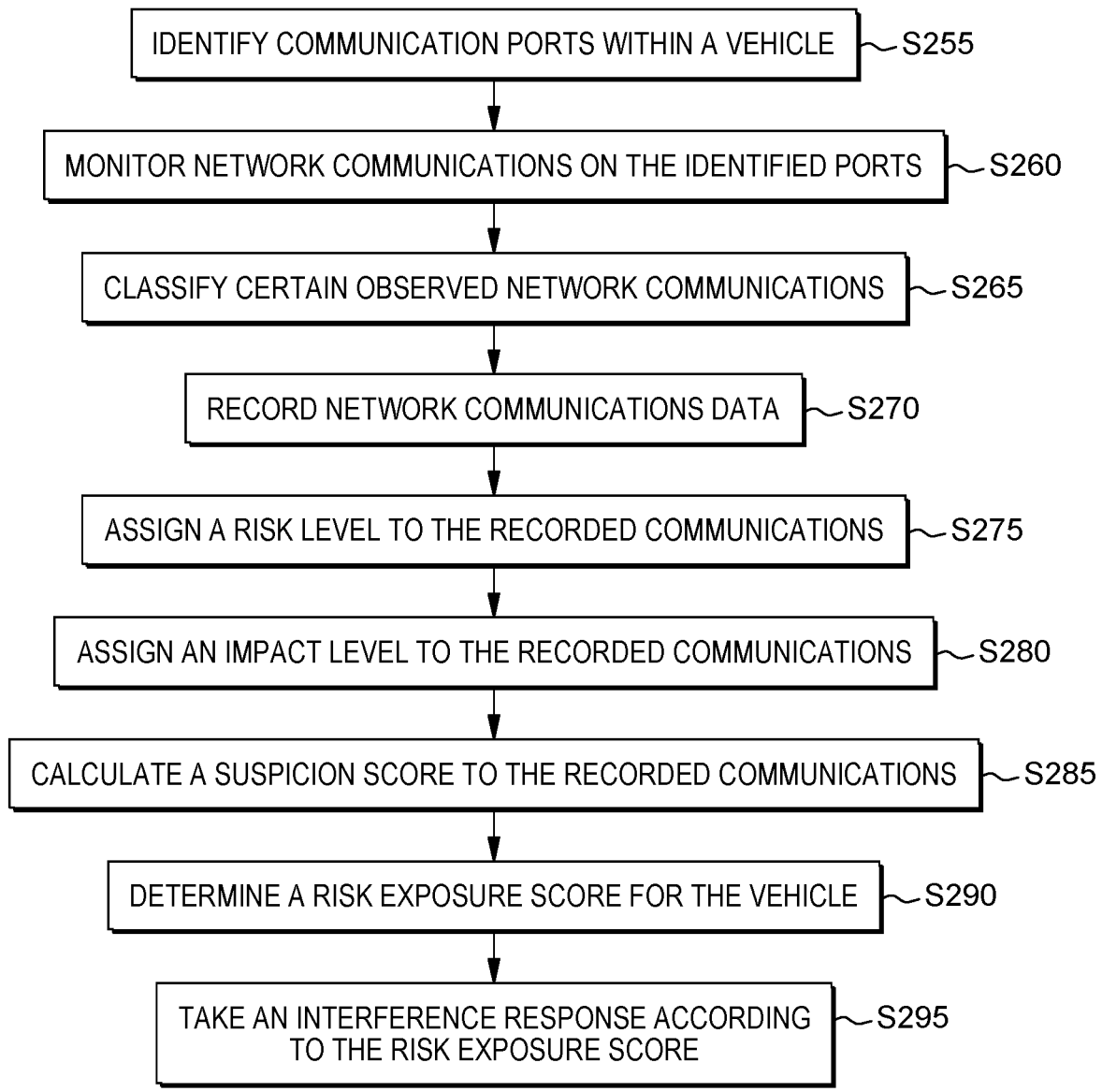
FIG. 2 is a flowchart showing a first embodiment method performed, at least in part, by the first embodiment system.
Figure 3:
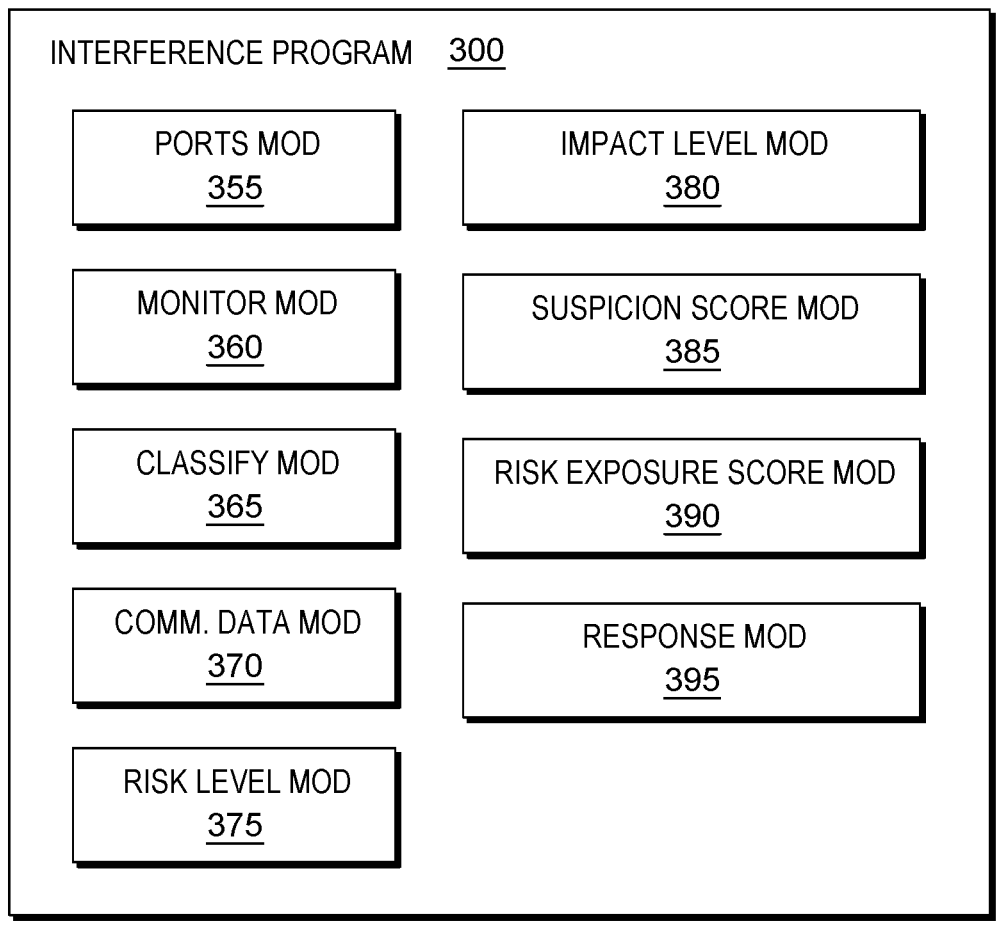
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where communication ports module ("mod") 355 identifies the various communication ports within the vehicle. In this example, the various communication ports are identified according to type of data flowing through the port. Data types include: (i) vehicle control data; (ii) location/positioning data; and (iii) social media data. Alternatively, the type of port is the basis of identification. Port types include: (i) serial port; (ii) parallel port; (iii) audio port; (iv) video port; (v) digital video interface; (vi) display port; (vii) RCE connector Port; (viii) component video port; (ix) S-video port; (x) HDMI port; (xi) USB port; (xii) external Serial AT Attachment (e-SATA) port; and (xiii) Sony/Phillips Digital Interface Format (S/PDIF).

Processing proceeds to step S260, where monitor mod 360 monitors network communications on the identified ports. In this example, network traffic is monitored for expected data type and content of data packages. In alternative embodiments, the identified ports are monitored for encrypted communications, IP address, data type, and/or content.

Processing proceeds to step S265, where classify mod 365 classifies certain observed network communications for analysis. Certain communications are of highest concern for security, such as combating attempts to interfere with the operation of an autonomous vehicle. In this example, communications for control of the vehicle and remote access to vehicle data are classified for analysis. Alternatively, all communications are classified and processed. Classifications of communication include: (i) port-type matching communication; (ii) data-type matching communication; (ii) vehicle operations communication; (iii) location/positioning communication; (iv) social media communication; (v) remote command communication; (vi) vehicle navigation communications; (vii) port type mis-matching communication; (viii) data type mis-matching communication; and (ix) port specific communications, such as parallel port communications. Determination of which observed network communications are classified depends on user preference, governing policies, and/or desired level of security. Level of security may vary by travel plan/itinerary and/or geographic location of the vehicle.

Processing proceeds to step S270, where communications data module records network communications data to a network usage store. In this example, communications data that is classified at step S265 is stored in network usage store 302. Alternatively, all observed network communications data is stored. Where all communications data is stored, some embodiments of the present invention tag certain communications that are classified at step S265. In that way, tagged communications are analyzed automatically, while other non-tagged, but stored, communications data may be analyzed upon request or upon authorization. Further, in this example, classified communications data is stored with reference to the date/time commenced and duration of communication. Alternatively, communications data is stored with reference to port identification, classification (if any), originating IP address, and/or encryption status/type.

Processing proceeds to step S275, where risk level mod 375 assigns a risk level to recorded communications. Risk level refers to the likelihood that a recorded communication will negatively impact the security of the vehicle. Factors for assigning risk level include originating IP address, content of communications data, encryption status/type, and/or data type. In this example, risk level mod 375 determines if content of the recorded communications data is likely to impact the security of the vehicle. Determination of likely impact of communication content includes: a keyword, a key phrase; a code snippet, and/or other pre-defined content characteristic. The risk level mod further assigns a risk level according to whether the expected data type is, in fact, the data type communicated by the identified port. For example, high-risk content is assigned a level 4 out of 4 and an unexpected data type drives a rating of 2 out of 2 (where a rating of 1 is for expected data type). Further, low-risk content would be rated 1. The overall risk rating of this example is 6 out of 6, the highest risk level available. Alternatively, the risk level mod references a list of high-risk IP addresses, provided by, for example, diagnostic service 112 (FIG. 1). The risk level is adjusted up or down depending on if the IP address is flagged as being a high risk address. Alternatively, various data types have predefined risk level components, that is, social media data is a low-risk data type and vehicle control data is a high-risk data type. The particular risk level value of high-risk IP address and social media data should be weighted for relevance to risk with respect to any other factors considered, such as a maximum value of 2 for data type and 4 for content. Additional discussion and alternative embodiments of risk level is found in Further Comments and/or Embodiments Section of this Detailed Description.

Processing proceeds to step S280, where impact level mod 380 assigns an impact level to recorded communications. Impact level refers to the likely extent of harm or damage caused by the potentially harmful communications. Factors for impact level include geographic location of the vehicle, size of the vehicle, and/or type of vehicle. In this example, impact level mod 380 determines the extent to which high-risk content may cause harm or damage to the vehicle, passengers, pedestrians, or surroundings. High-risk content is content assigned a risk level above a pre-defined threshold of risk. Where the content is not assigned a risk level above a threshold risk level, the impact level mod assigns an impact level of zero without analysis or review of impact factors.

In this example, impact level values are determined with reference to pre-defined values for certain aspects considered by the impact level mod. Certain components of an impact level are predefined for a particular vehicle traveling a particular route where vehicle-specific data, size and type, is fixed and the location of the vehicle along the route is known. Alternatively, impact level determinations vary periodically while the vehicle travels along a particular route because of factors such as density of other vehicles and/or pedestrian traffic. In this example, impact level mod 380 calculates an impact level because the risk level determined in step S275 is 6, the highest risk level available according to the algorithm. Further, in this example, the impact level is a multiplier of the assigned risk level with values from 0 to 1, incremented by 0.25. Alternatively, the impact level is a whole number having a value range that corresponds to the risk level such that a mathematical combination of the two produces an actionable composite value of the assigned risk level and impact level. Additional discussion and alternative embodiments of impact level is found in Further Comments and/or Embodiments Section of this Detailed Description.

Processing proceeds to step S285, where suspicion score mod 385 calculates a suspicion score for the classified communications. The suspicion score is an impact-weighted value of the risk level assigned to a particular communication. Each connection classified at step S265 is assigned a suspicion score. In this example, the value of the impact level serves to weigh the risk level in view of potential impact the communication will have if, in fact, the communication has a malicious purpose. In that way, a low impact level operates to significantly reduce a composite score, or suspicion score, relative to the risk level when determined according to the formula:

$$S=R*I,$$

where S is Suspicion Score, R is Risk Level, and I is Impact Level.

Alternatively, the impact level is assigned the same range of values as the risk level and the suspicion score is the sum of the impact level and the risk level. In various embodiments, the values of the impact level and risk level are designed such that a particular result, when mathematically combined, forms a suspicion score suitable for processing according to embodiments of the present invention.

Processing proceeds to step S290, where risk exposure score mod 390 determines a risk exposure score for the vehicle. In practice, multiple communication ports in a vehicle receive and transmit data of various types. Further, there are a fixed number of communication ports for each vehicle. In this example, each port involved in communications that are classified in step S265 is assigned a suspicion score. The risk exposure score is the highest suspicion score for any port within the vehicle at a particular time. In that way, only one high suspicion communication serves to drive particular automobile interference responses. The term "interference response," as used herein, refers to a responsive action for remediation of the effects of a potentially harmful communication and/or blocking or preventing the potentially harmful communication from causing harm to the surrounding environment, whether pedestrians, other vehicles, or property and to persons within the vehicle. Alternatively, the average or median suspicion score among ports sending and/or receiving data at a particular time is the risk exposure score. Alternatively, only suspicion scores meeting a threshold level are the basis of the average suspicion score assigned to the vehicle. Regardless of the use of suspicion scores to derive an overall risk exposure score for the vehicle, the calculated risk exposure score is associated with the vehicle as a whole and the vehicle is managed according to a current, or most recent, risk exposure score.

Figure 5:
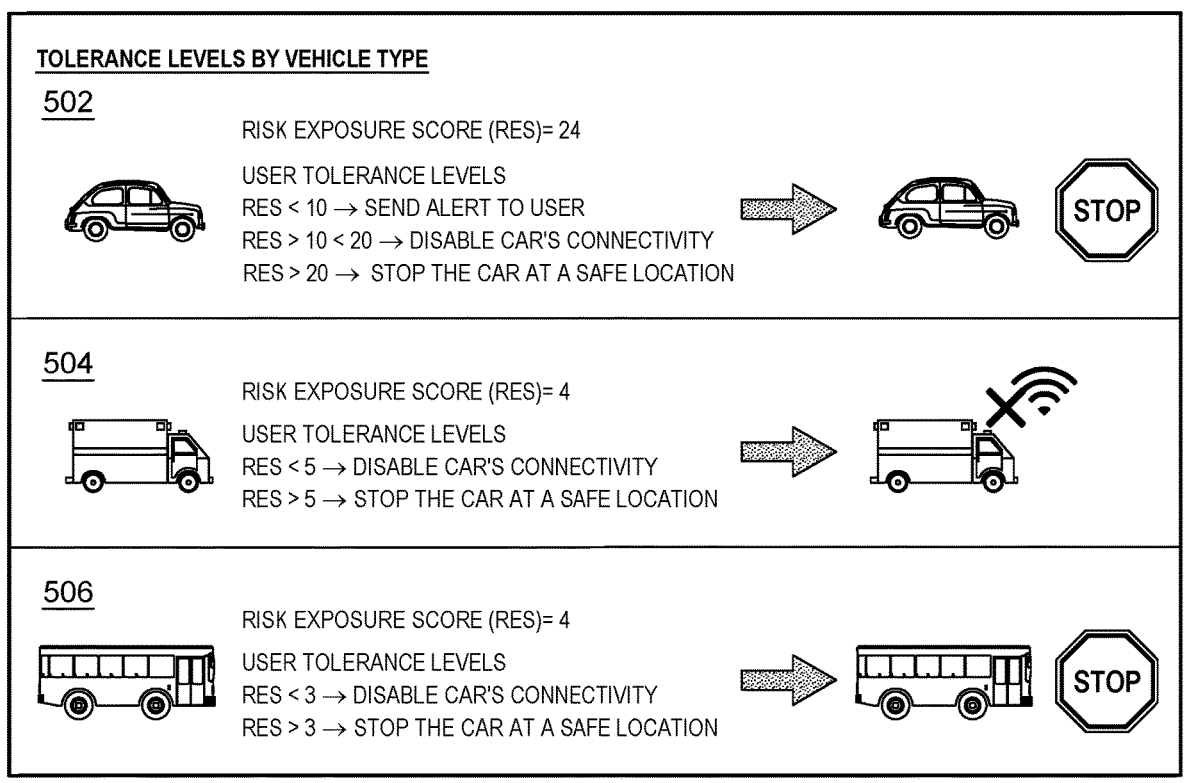
FIG. 5 is a table view showing information that is generated by and/or helpful in understanding embodiments of the present invention.

Processing proceeds to step S295, where response mod 395 takes an interference response according to the calculated risk exposure score of the vehicle. Interference response actions include: (i) ignoring remote commands; (ii) disabling remote command capability; (iii) prompting for and/or requiring user-approval of incoming remote commands; (iv) blocking or dropping a particular connection associated with the risk exposure score; (v) blocking or dropping all communications until a safe, or otherwise suitable, risk exposure score is calculated; (vi) sending an alert to a passenger, or user; (vii) physically stopping travel of the vehicle; and/or (viii) when vehicle movement is detected, causing the vehicle to move to a safe location and stopping the vehicle from moving. As discussed herein, potential attempts to interfere with autonomous vehicle communications channels are identified and corrective actions, or interference response actions, are taken when deemed appropriate according to algorithms disclosed herein. Specific values of the risk exposure score and the corresponding interference response actions are a matter of user preference, governing policy, or otherwise pre-defined for acting during use of the autonomous vehicle. In this example, responsive actions are assigned threshold risk exposure levels and are recorded at interference response table 306. Example responsive actions are shown in FIG. 5 at table 500. The pre-defined correspondence of risk exposure level to interference response action is presented as user tolerance levels where the user inputs or selects responsive actions for specified risk exposure levels.

III. Further Comments and/or Embodiments

Some embodiments of the present invention recognize the following facts, potential problems and/or potential areas for improvement with respect to the current state of the art: (i) remote interference may be devised to take advantage of the high available bandwidth of an autonomous vehicle; (ii) monitoring electronic communications at the vehicle can detect attempts to interfere with the performance of the autonomous vehicle; and/or (iii) monitoring electronic communications at the vehicle can detect attempts to use the communication system of the vehicle to flood the bandwidth and/or resources of a targeted system, such as with a distributed denial-of-service initiative.

Figure 4:
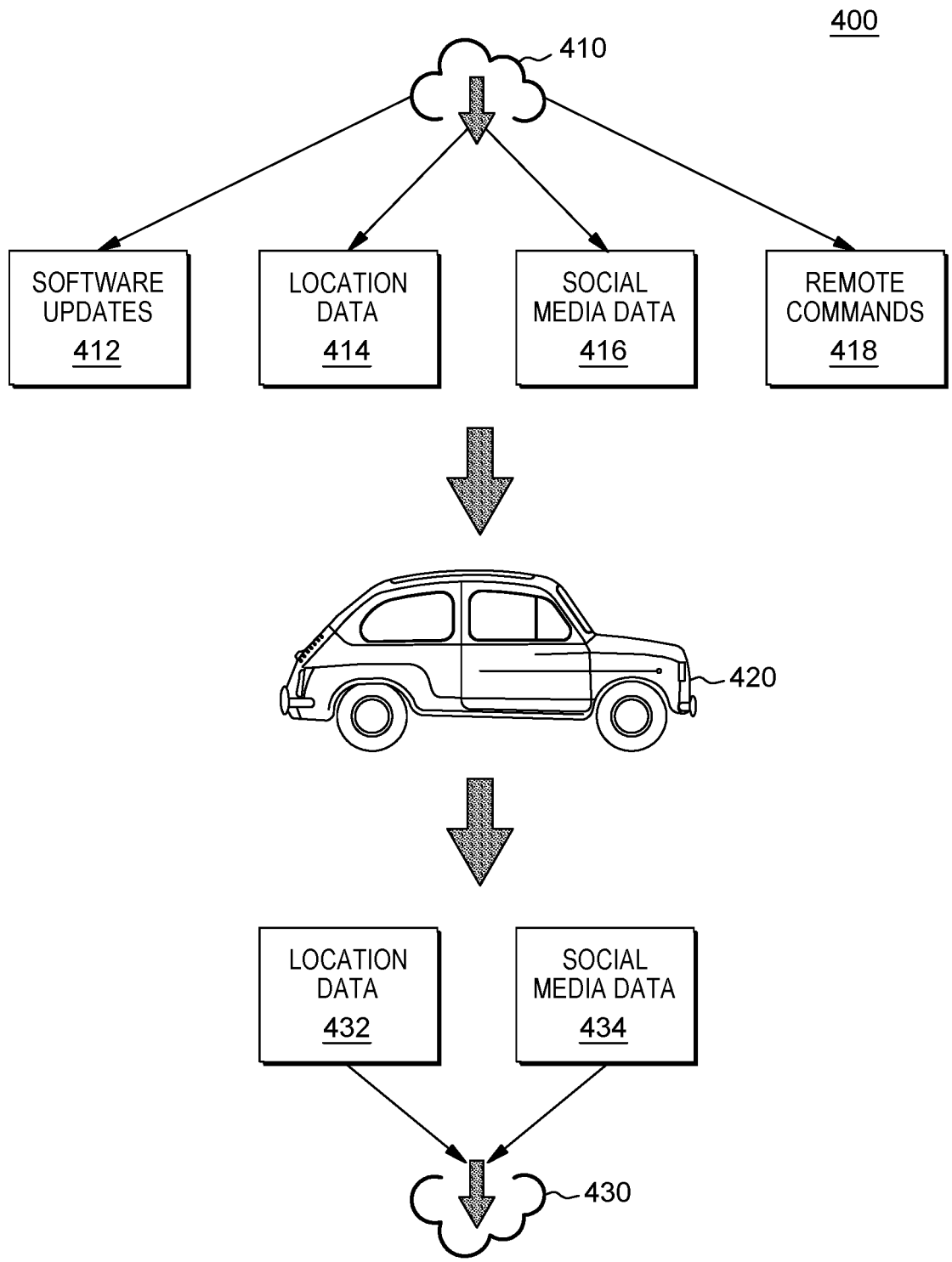
FIG. 4 is a block diagram view of a second embodiment of a system according to the present invention.

FIG. 4 shows block diagram 400 depicting a second embodiment system according to an embodiment of the present invention. As shown in diagram 400, data is downloaded to autonomous vehicle 420 via communication channels from network 410, which may be associated with any connected network environment including a cloud, vehicle-to-vehicle (V2V), or infrastructure-to-vehicle (I2V) environments. Similarly, data is uploaded from the vehicle 420 to network 430. Some embodiments of the present invention monitor both download streams and upload streams for attempt to interfere with normal operation of the autonomous vehicle.

As depicted in the figure, download data is categorized into various type of packages according to the package content, status, and source internet protocol (IP) address. In the example shown, download data includes categories of software updates 412, location data 414, social media data 416, and remote commands 418. Alternatively, various categories of data are assigned to incoming data including an undetermined category for data not falling within a pre-defined category. Certain data is evaluated for purpose and/or compliance with documented criteria including IP address, remote operational commands, and malicious code. In some embodiments, a security module operates to categorize incoming connections based on a purpose of the packages. Remote commands include, for example, a command to apply the brakes, accelerate, or down shift.

Some embodiments of the present invention determine a category of incoming communication and/or purpose of the incoming communication by considering the following: (i) recognizing the corresponding communication ports within the vehicle; (ii) communication package content; (iii) communication package status, such as whether the communication is encrypted; and (iv) originating IP address.

Some embodiments of the present invention block transmission and alert the passenger of the autonomous vehicle when remote operational commands are received, for example, the dashboard may include a user-selectable question "Accept Remote Commands?" In that way, the user may be required to take a specific action to accept the identified remote commands. In some instances, the passenger will expect and/or benefit from allowing remote operational commands. Some embodiments of the present invention block all incoming remote operational commands when vehicle movement is detected and/or while the vehicle is moving.

As depicted, upload data includes categories of location data 432 and social media data 434. Alternatively, various categories of data are assigned to outgoing, or upload, data according to pre-defined categories. Certain data values are evaluated for outgoing data. These values may include target IP addresses, transmission bandwidth, and/or transmission duration.

Some embodiments of the present invention deploy a risk assessment module to assess the risk associated with the various monitored network connections. Each monitored connection is assigned a risk level and an impact level based on the category and characteristics of communications, whether by downloading or uploading data. Calculation of a risk exposure score (RES) is as follows:

$$RES = \Sigma SC, \text{ and}$$

$$SC = RL * IL, \text{ where}$$

SC is the suspicious connection score; RL is the risk level; and IL is the impact level.

The risk level is a value assigned to a particular communication relative to other communications based on the type of data being communicated, the source of the data, and the status of the data, such as bandwidth and duration. The impact level is a value assigned to a communication based on the potential for changing the function of the autonomous vehicle. That is, location data is not likely to cause the vehicle to change its function, or current trajectory or operating status, but a remote command to accelerate or stop the vehicle is highly likely to change the function or operation of the vehicle.

Many schemes may be developed to assign a range of values to the risk and impact levels. However, the levels are assigned ratings, they should cooperate to produce a suspicious connection value that may be summed over the many connection scores to arrive at a risk exposure score (RES).

The equation provided in this example determines the RES by summing up all of the suspicious connection scores. Alternatively, the RES is calculated by determining the average suspicious connection score. Alternatively, the RES is calculated as the highest SC score for any connection port. As discussed with respect to the triggering module, the RES is used as a reference value to determine what action is to be taken.

The following example illustrates the determination of a suspicious connection score and the subsequent RES value data download, or incoming communications. An autonomous vehicle having four monitored communication ports has the following input categories identified at one time. A first connection is originated by a blacklisted IP address. For the identified address and the corresponding package content, the first connection is assigned a risk level of 2 out of a possible 5, the impact level is assigned a 3 out of 5. The second connection is communicating location data. Accordingly, the risk level and impact level are assigned levels of zero. The third connection is communicating a remote command to control the vehicle. Because of the heightened concern about remote commands causing the vehicle to change its function, the risk level is 4 of 5 and the impact level is 5 of 5. The fourth connection has an unknown content received from a trusted source, so the risk level is only 2 of 5 and the impact level is 1 of 5.

Each connection has a corresponding SC calculation, the first connection has an SC of 6, the second has a SC of 0, the third has an SC of 20, and the fourth has an SC of 2. The overall score, the RES, is the sum of the SC values, 6+0+20+2=28. Alternatively, the RES is equal to the average SC score, 28÷4=7. Alternatively, the highest individual SC value is the RES, so the RES would be 20.

For determining the SC value and corresponding RES for data upload, or outgoing communications, the four communication ports have the following status according to monitoring by the security module. The first connection is sending data above a threshold bandwidth to an unfamiliar IP address. The risk level is assigned a 4 out of 5 and the impact level is 5 out of 5, for likelihood that the high bandwidth use is operating as part of a distributed denial-of-service (DDOS) initiative. The second connection is communicating with a blacklisted IP address, so the risk level is 5 and the impact level is 4. The third connection is communicating location data with risk and impact levels of zero. Also, the fourth connection is communicating social media data. The risk level is 0 and the impact level is 0.

Each connection has a corresponding SC calculation, the first connection has an SC of 20, the second has a SC of 20, and the third and fourth connections have SC scores of 0. The overall score, the RES, is the sum of the SC values, 20+20+0+0=40. Alternatively, the RES is equal to the average SC score, 40÷4=10. Alternatively, the highest individual SC value is the RES, so the RES would be 20.

Some embodiments of the present invention deploy a triggering module to take actions according to a current RES value. In this example, actions are determined according to user tolerance level (UTL) values. These values indicate an action that corresponds to a particular range or RES values. Relatively low ranging values of the RES are assigned less abrupt actions than relatively high ranging values. Actions taken by the triggering module or otherwise taken responsive to the calculated RES include: (i) sending an alert to a designated user; (ii) disabling network connectivity of the autonomous vehicle; (iii) stopping the vehicle at a nearest safe location; (iv) ignoring remote commands when vehicle movement is detected; (v) disabling remote commands; (vi) blocking a connection deemed to be malicious, inbound or outbound; (vii) reporting to a user when a connection exceeds a pre-determined bandwidth or data package size; and/or (viii) blocking a connection that exceeds a pre-determined bandwidth or data package size.

Some embodiments of the present invention establish user tolerance levels for determining evasive actions for high risk communications. In this example, the user tolerance level varies by type of vehicle. Alternatively, the user tolerance level is based on user-input such that a user having a low tolerance of remote commands interfering with the use of a vehicle is able to direct aggressive actions for detection of a relatively low risk communication.

FIG. 5 shows table 500 illustrating how an embodiment of the present invention uses a risk exposure score (RES) with user tolerance levels according to vehicle type, car 502, truck 504, and bus 506. As illustrated for car 504, a calculated RES of 24 leads a triggering module, discussed above, to stop the car at a safe location because the RES of 24 is greater than 20. Continuing with the table, a risk exposure score of 4 leads to disabling the truck's connectivity because the RES is less than 5. Finally, for a bus having a score of 4 leads to stopping the bus at a safe location because the score is greater than 3.

Some embodiments of the present invention deploy an inbound connection analyzer subsystem for monitoring communication ports and taking actions responsive to triggering risk scores. Actions that may be taken responsive to adequate risk scores include: (i) ignoring remote commands if the car is in motion; (ii) disabling remote commands; (iii) prompting for and/or requiring user-approval before applying remote commands; (iv) blocking or dropping a connections having a high RES value; (v) blocking or reporting connections above threshold bandwidth, both incoming and outgoing.

Some embodiments of the present invention identify triggering conditions leading to remedial actions with reference to a user profile. Alternatively, the triggering actions are associated with a vehicle profile, or a pre-determined set of rules for a given driving location, or as best practices recorded by the vehicle manufacturer. In some embodiments of the present invention, triggering conditions are risk exposure scores. The risk exposure score is assigned a particular responsive action according to the vehicle profile, rules for the given location, and/or a best-practices guide provided by the vehicle manufacturer.

Some embodiments of the present invention store network usage data and detect patterns of usage. Network usage deviating from the historic data usage patterns supports calculation of higher risk than that of typical data usage.

Some embodiments of the present invention are directed to a method for securing autonomous vehicles against remote interference, the method comprising: monitoring inbound and outbound network connections of an autonomous vehicle; for each monitored connection, assigning a risk value, where the risk value is based, at least in part, on: (i) an amount of risk associated with the data being transferred over the connection (e.g. type of data, source of data), and (ii) an amount of potential impact that the data being transferred over the connection could have on the functioning of the autonomous vehicle; and in response to the risk value for a monitored connection exceeding one or more thresholds, performing a mitigating action on the autonomous vehicle. Additionally, if the risk value exceeds a first threshold, the mitigating action includes sending an alert to a passenger of the autonomous vehicle (e.g. via the vehicle's dashboard or via a mobile app). Further, if the risk value exceeds a second threshold, the mitigating action further includes disabling the autonomous vehicle's network connectivity. Still further, if the risk value exceeds a third threshold, the mitigating action further includes stopping the autonomous vehicle at a safe location.

Some embodiments of the present invention may include one, or more, of the following features, characteristics and/or advantages: (i) communications security is enhanced for an autonomous vehicle by requiring human intervention when a risk of remote interference is detected; (ii) network usage history is maintained for use in identifying high risk communication patterns; (iii) the risk of each network communication directed to an autonomous vehicle is identified and managed according to a low, medium, or high risk assessment value; (iv) the risk of each network communication sent from an autonomous vehicle is identified and managed according to a low, medium, or high risk assessment value; and (v) attempts to hack a control system of an autonomous vehicle are detected my monitoring incoming and outgoing network traffic.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for securing an autonomous vehicle, the method comprising:
   classifying network communications received at a set of communication ports within a vehicle;
   determining a risk level for network communications having target classifications;
   responsive to a set of high-risk communication, determining an impact level for each high-risk communication of the set of high-risk communications;
   assigning a set of suspicion scores to high-risk communications of the set of high-risk communications received during a tracking period, each suspicion score being a mathematical combination of the risk level and the impact level determined for a respective high-risk communication received during the tracking period;
   determining, for the vehicle, a risk exposure score corresponding to the set of suspicion scores assigned to the high-risk communications received during the tracking period; and
   taking an interference response assigned to the risk exposure score;
   wherein:
   the high-risk communications of the set of high-risk communications are network communications assigned risk levels meeting a threshold value.

2. The method of claim 1, wherein the target classifications are vehicle navigation communications and vehicle operations communications.

3. The method of claim 2, further comprising:
   responsive to detecting movement of the vehicle, blocking the vehicle operations communications.

4. The method of claim 2, further comprising:
   responsive to classifying a first vehicle operations communication, prompting a user for approval to accept the first vehicle operations communication.

5. The method of claim 1, further comprising:
   identifying the set of communication ports within the vehicle; and
   monitoring network communications on the identified ports;
   wherein the set of communication ports are identified individually by type of data flowing through each port of the set of communication ports.

6. The method of claim 5, wherein a target classification of the network communications is a data type mis-matching communication.

7. The method of claim 1, further comprising:
   recording the classified network communications.

8. The method of claim 1, wherein the target classifications of the network communications include location communications.

9. The method of claim 1, wherein the interference response is assigned to the risk exposure score according to a best-practices guide provided by a manufacturer of the vehicle.

10. A computer program product comprising a computer-readable storage medium having a set of instructions stored therein which, when executed by a processor, causes the processor to secure an autonomous vehicle by:
    classifying network communications received at a set of communication ports within a vehicle;
    determining a risk level for network communications having target classifications;
    responsive to a set of high-risk communication, determining an impact level for each high-risk communication of the set of high-risk communications;
    assigning a set of suspicion scores to high-risk communications of the set of high-risk communications received during a tracking period, each suspicion score being a mathematical combination of the risk level and the impact level determined for a respective high-risk communication received during the tracking period;
determining, for the vehicle, a risk exposure score corresponding to the set of suspicion scores assigned to the high-risk communications received during the tracking period; and
taking an interference response assigned to the risk exposure score;
wherein:
the high-risk communications of the set of high-risk communications are network communications assigned risk levels meeting a threshold value.

11. The computer program product of claim 10, wherein the target classifications are vehicle navigation communications and vehicle operations communications.

12. The computer program product of claim 10, further causing the processor to secure the autonomous vehicle by:
identifying the set of communication ports within the vehicle; and
monitoring network communications on the identified ports;
wherein the set of communication ports are identified individually by type of data flowing through each port of the set of communication ports.

13. The computer program product of claim 10, further causing the processor to secure the autonomous vehicle by:
recording the classified network communications.

14. The computer program product of claim 10, wherein the target classifications of the network communications include location communications.

15. A computer system for securing an autonomous vehicle, the computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to secure the autonomous vehicle by:
classifying network communications received at a set of communication ports within a vehicle;
determining a risk level for network communications having target classifications;
responsive to a set of high-risk communication, determining an impact level for each high-risk communication of the set of high-risk communications;
assigning a set of suspicion scores to high-risk communications of the set of high-risk communications received during a tracking period, each suspicion score being a mathematical combination of the risk level and the impact level determined for a respective high-risk communication received during the tracking period;
determining, for the vehicle, a risk exposure score corresponding to the set of suspicion scores assigned to the high-risk communications received during the tracking period; and
taking an interference response assigned to the risk exposure score;
wherein:
the high-risk communications of the set of high-risk communications are network communications assigned risk levels meeting a threshold value.

16. The computer system of claim 15, wherein the target classifications are vehicle navigation communications and vehicle operations communications.

17. The computer system of claim 15, further causing the processor to secure the autonomous vehicle by:
identifying the set of communication ports within the vehicle; and
monitoring network communications on the identified ports;
wherein the set of communication ports are identified individually by type of data flowing through each port of the set of communication ports.

18. The computer system of claim 17, wherein a target classification of the network communications is a data type mis-matching communication.

19. The computer system of claim 15, further causing the processor to secure the autonomous vehicle by:
recording the classified network communications.

20. The computer system of claim 15, wherein the target classifications of the network communications include location communications.

* * * * *